United States Patent
Parsons (10) Patent No.: US 9,442,022 B2
(45) Date of Patent: Sep. 13, 2016

(54) TEMPERATURE SENSING DEVICE AND METHOD OF ASSEMBLING THE SAME

(75) Inventor: John Patrick Parsons, Norwich, NY (US)

(73) Assignee: UNISON INDUSTRIES, LLC, Jacksonville, FL (US)

( * ) Notice: Subject to any disclaimer, the term of this patent is extended or adjusted under 35 U.S.C. 154(b) by 1039 days.

(21) Appl. No.: 13/341,268

(22) Filed: Dec. 30, 2011

(65) Prior Publication Data

US 2013/0167554 A1    Jul. 4, 2013

(51) Int. Cl.
*G01K 1/12* (2006.01)
*G01K 1/14* (2006.01)
*G01K 13/02* (2006.01)

(52) U.S. Cl.
CPC . *G01K 1/12* (2013.01); *G01K 1/14* (2013.01); *G01K 13/02* (2013.01); *G01K 2013/024* (2013.01); *Y10T 29/49826* (2015.01)

(58) Field of Classification Search
CPC ............ G01K 1/08; G01K 1/12; G01K 1/14; G01K 13/02; G01K 2013/024; G01N 25/40; F05D 2270/80
See application file for complete search history.

(56) References Cited

U.S. PATENT DOCUMENTS

| | | | |
|---|---|---|---|
| 2,975,225 A * | 3/1961 | Barbieri | G01K 1/12 136/233 |
| 3,308,666 A * | 3/1967 | Anderson et al. | 338/28 |
| 3,451,268 A * | 6/1969 | Meador | 374/144 |
| 4,420,738 A | 12/1983 | Rehmann et al. | |
| 4,499,330 A | 2/1985 | Pustell | |
| 4,504,030 A | 3/1985 | Kniat et al. | |
| 4,601,202 A | 7/1986 | Colman et al. | |
| 4,733,975 A | 3/1988 | Komanetsky et al. | |
| 4,747,700 A * | 5/1988 | Lenz et al. | 374/135 |
| 5,348,395 A * | 9/1994 | Corr et al. | 374/135 |
| 5,718,512 A * | 2/1998 | Ngo-Beelmann | 374/148 |
| 6,270,253 B1 * | 8/2001 | Keller | 374/138 |
| 6,325,535 B1 * | 12/2001 | Gibson et al. | 374/29 |
| 6,595,062 B1 * | 7/2003 | Luke | F01D 17/085 73/170.02 |
| 7,056,085 B2 | 6/2006 | Ponziani | |
| 8,033,719 B2 * | 10/2011 | Beutin et al. | 374/158 |
| 8,555,651 B2 * | 10/2013 | Hein et al. | 60/752 |
| 2002/0122459 A1 * | 9/2002 | McFarland et al. | 374/179 |
| 2012/0216608 A1 * | 8/2012 | Schleif et al. | 73/112.01 |

FOREIGN PATENT DOCUMENTS

EP        1837636 A1    9/2007

OTHER PUBLICATIONS

European Search Report and Opinion issued in connection with corresponding EP Application No. 12197523.9 on Feb. 15, 2016.

* cited by examiner

*Primary Examiner* — Phutthiwat Wongwian
*Assistant Examiner* — Jason H Duger
(74) *Attorney, Agent, or Firm* — GE Global Patent Operation; William S. Munnerlyn (57) ABSTRACT

A method of assembling a temperature sensing device for a gas turbine engine is provided. The method includes providing a temperature sensor and providing a housing configured to envelop the temperature sensor. The method further includes mounting the temperature sensor within the housing such that a portion of the temperature sensor is disposed outside of the housing and such that the housing is configured to receive a flow of cooling air.

15 Claims, 9 Drawing Sheets

TEMPERATURE SENSING DEVICE AND METHOD OF ASSEMBLING THE SAME

BACKGROUND OF THE INVENTION

The field of this disclosure relates generally to sensors and, more particularly, to a temperature sensing device for a combustion section of a gas turbine engine.

Exhaust gas temperature in the combustion section of a gas turbine engine is an operating parameter that is often used by the engine control unit to determine fuel input to the combustor. As such, accurate measurements of the exhaust gas temperature within the combustor can facilitate improved operating efficiency of the engine by enabling optimized fuel inputs. Additionally, engine components within, and downstream of, the combustion section (e.g., turbine blades) are typically exposed to significant thermal stresses associated with the higher temperature of the exhaust gases, and the useful life of these downstream components is often estimated using expected exhaust gas temperatures in the combustor. Therefore, accurate measurements of the exhaust gas temperature can facilitate making the expected exhaust gas temperatures more accurate and, as a result, facilitate making the component life estimations more accurate as well.

At least some known exhaust gas temperature (EGT) sensors used in gas turbine engines include a thermocouple element. However, in order to have a higher reactance, these thermocouple elements often have smaller diameters. In that regard, exhaust gases within the engine can reach velocities of at least 240 m/s, and these smaller diameter thermocouple elements typically do not have enough rigidity to resist the drag associated with the exhaust gas flow velocity. As a result, some known EGT sensors have thermocouple elements that are disposed within a more rigid housing to provide increased support to withstand the associated drag, and most of these housings are fabricated from higher temperature rated alloys. However, the exhaust gases can reach temperatures of at least 2300° F. As a result, most known EGT sensors are inserted downstream of the combustor in areas where exhaust gas temperatures are below the service limit of the alloy housings (e.g., a few stages into the high-pressure turbine), and the downstream temperature measurements are used to estimate temperatures of the exhaust gases in the combustor. These estimated exhaust gas temperatures are then used by the engine controller to determine fuel input parameters for the combustor. Thus, to improve the accuracy of exhaust gas flow temperature measurements, it would be desirable to have a temperature sensing device that can be inserted directly into higher temperature locations within the exhaust gas flow of the combustor.

BRIEF DESCRIPTION OF THE INVENTION

In one aspect, a method of assembling a temperature sensing device for a gas turbine engine is provided. The method includes providing a temperature sensor and providing a housing configured to envelop the temperature sensor. The method further includes mounting the temperature sensor within the housing such that a portion of the temperature sensor is disposed outside of the housing and such that the housing is configured to receive a flow of cooling air.

In another aspect, a temperature sensing device for a gas turbine engine is provided. The temperature sensing device includes a temperature sensor and a housing configured to envelop the temperature sensor such that a portion of the temperature sensor is disposed outside of the housing. The housing is configured to receive a flow of cooling air.

In another aspect, a gas turbine engine is provided. The gas turbine engine includes a combustion chamber and a temperature sensing device extending into the combustion chamber. The temperature sensing device includes a temperature sensor and a housing configured to envelop the temperature sensor such that a portion of the temperature sensor is disposed outside of the housing. The housing is configured to receive a flow of cooling air.

DETAILED DESCRIPTION OF THE INVENTION

The following detailed description sets forth a temperature sensing device and a method of assembling the same by way of example and not by way of limitation. The description should clearly enable one of ordinary skill in the art to make and use the temperature sensing device, and the description sets forth several embodiments, adaptations, variations, alternatives, and uses of the temperature sensing device, including what is presently believed to be the best mode thereof. The temperature sensing device is described herein as being applied to a preferred embodiment, namely a gas turbine engine. However, it is contemplated that the temperature sensing device and the method of assembling the same have general application in a broad range of systems and a variety of other commercial, industrial, and consumer applications.

Figure 1:
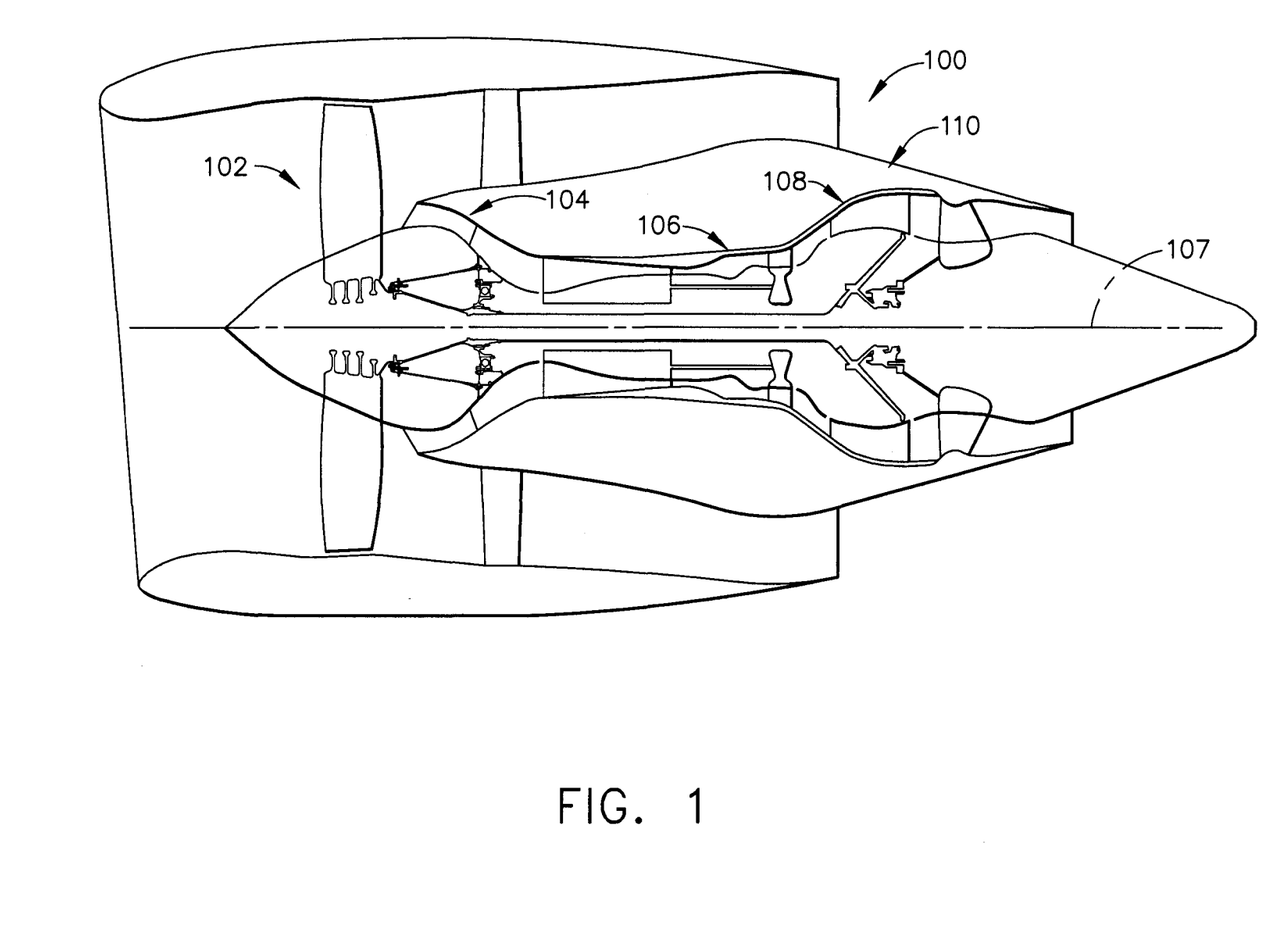
FIG. 1 is a schematic illustration of an exemplary gas turbine engine.

FIG. 1 is a schematic illustration of an exemplary gas turbine engine 100 including a fan section 102, a compressor section 104, a combustion section 106, a high pressure turbine section 108, and a low pressure turbine section 110 that are aligned along a centerline axis 107. During operation, air flows through fan section 102 and is supplied to compressor section 104. The compressed air is delivered to combustion section 106, in which it is mixed with fuel and ignited to produce combustion gases. The combustion gases flow from combustion section 106 through turbine sections 108, 110 and are subsequently exhausted from gas turbine engine 100. In other embodiments, gas turbine engine 100 may include any suitable number of fan sections, compressor sections, and/or turbine sections arranged in any suitable manner.

Figure 2:
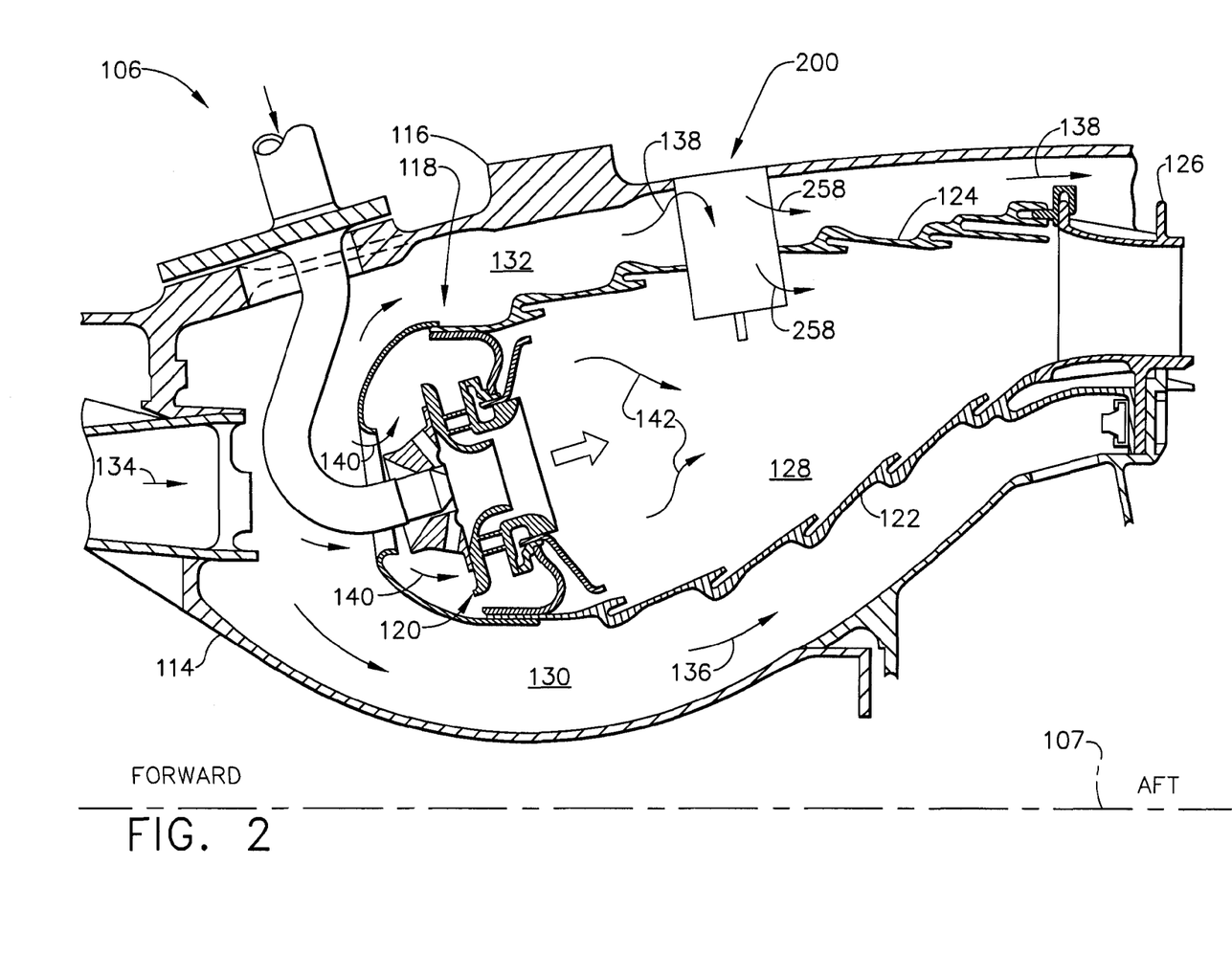
FIG. 2 is a schematic illustration of the combustion section of the gas turbine engine shown in FIG. 1.

FIG. 2 is a schematic illustration of combustion section 106. In the exemplary embodiment, combustion section 106 includes an annular inner casing structure 114, an annular outer casing structure 116, and a combustor assembly 118. Combustor assembly 118 is disposed between inner casing structure 114 and outer casing structure 116, and combustor assembly 118 includes a fuel nozzle 120, an igniter (not shown), and a pair of inner and outer liners 122, 124. Fuel nozzle 120 extends through outer casing structure 116, and liners 122, 124 are coupled to fuel nozzle 120 and extend from fuel nozzle 120 to a nozzle 126 of high pressure turbine section 108 such that a combustion chamber 128 is defined between liners 122, 124. An inner bypass flow path 130 is defined between inner casing structure 114 and inner liner 122, and an outer bypass flow path 132 is defined between outer casing structure 116 and outer liner 124. Compressed air 134 delivered from compressor section 104 to combustion section 106 is divided into an inner bypass flow 136 that cools inner liner 122, an outer bypass flow 138 that cools outer liner 124, and an intermediate flow 140 that is directed into combustion chamber 128 to be mixed with fuel and ignited to produce a combustion gas flow 142 through combustion chamber 128 and into nozzle 126 of high pressure turbine section 108.

As described in more detail below, a temperature sensing device 200 (e.g., an exhaust gas temperature (EGT) sensing device) is coupled to outer casing structure 116 and extends through outer bypass flow path 132 and into combustion chamber 128 through outer liner 124 to facilitate determining a temperature of combustion gas flow 142. In other embodiments, temperature sensing device 200 may be coupled to inner casing structure 114 and extend into combustion chamber 128 through inner bypass flow path 130. Alternatively, temperature sensing device 200 may be coupled to any suitable structure of gas turbine engine 100 that facilitates enabling temperature sensing device 200 to function as described herein. As used herein, references to temperature sensing device 200 in terms of orientation within gas turbine engine 100 (e.g., references such as a component X of temperature sensing device 200 has an 'axially forward region' or an 'axially aft region') are intended to mean that temperature sensing device 200 is configured to be oriented in such a manner when temperature sensing device 200 is mounted within gas turbine engine 100 as described herein, and such references to orientation are not intended to limit the scope of this disclosure to only those temperature sensing devices that are actually mounted within gas turbine engine 100. Rather, this disclosure is intended to apply to temperature sensing devices in general, whether mounted within a gas turbine engine or not.

Figure 3:
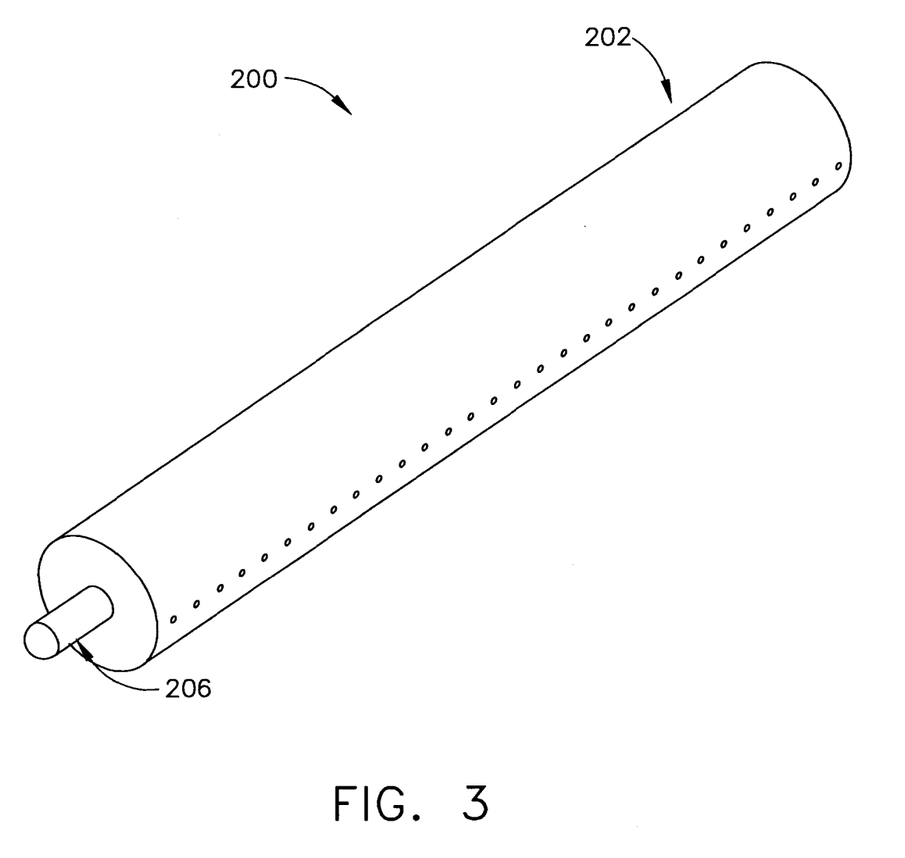
FIG. 3 is a perspective view of a temperature sensing device for use in the combustion section shown in FIG. 2.
Figure 4:
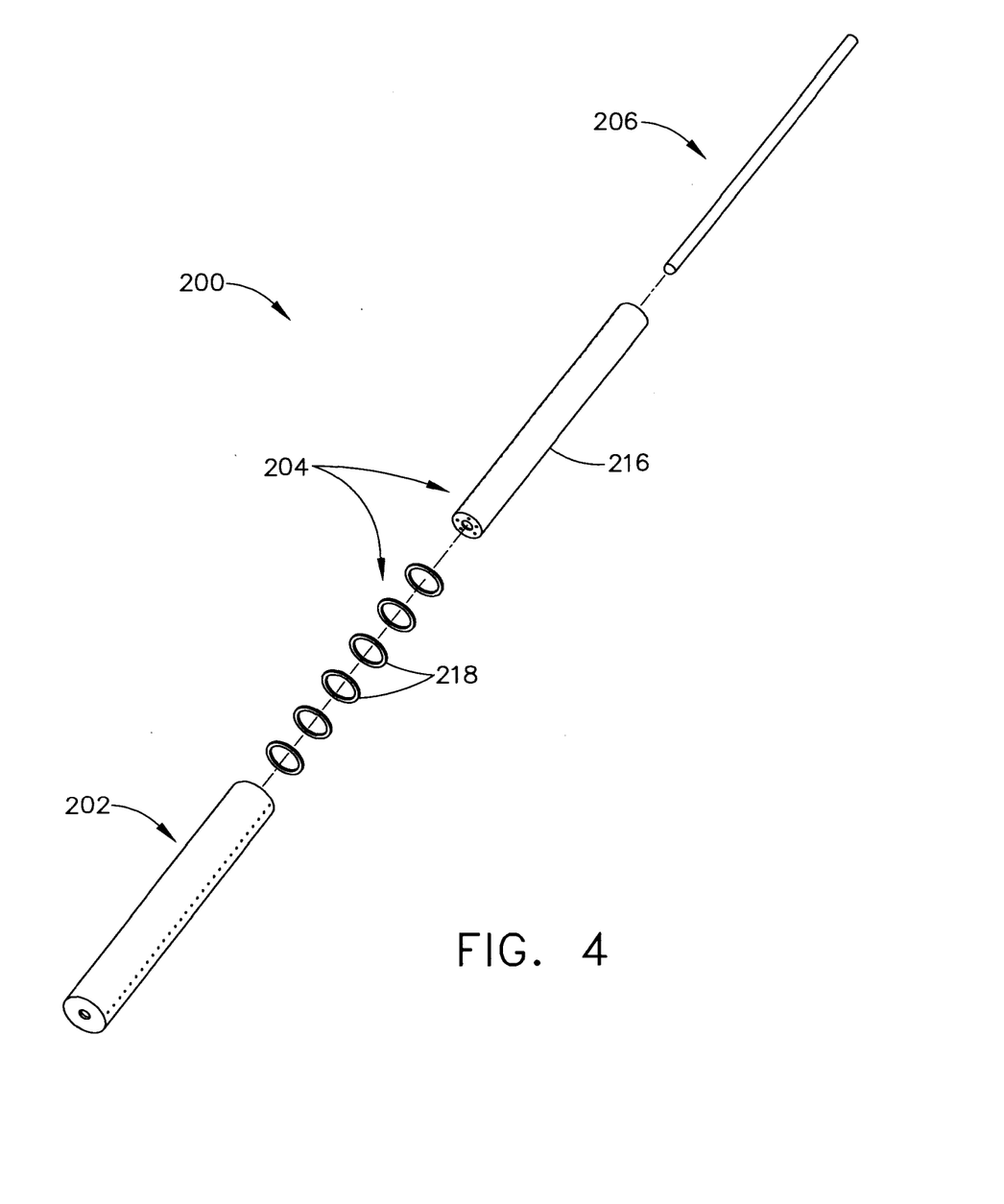
FIG. 4 is an exploded view of the temperature sensing device shown in FIG. 3.
Figures 5, 6:
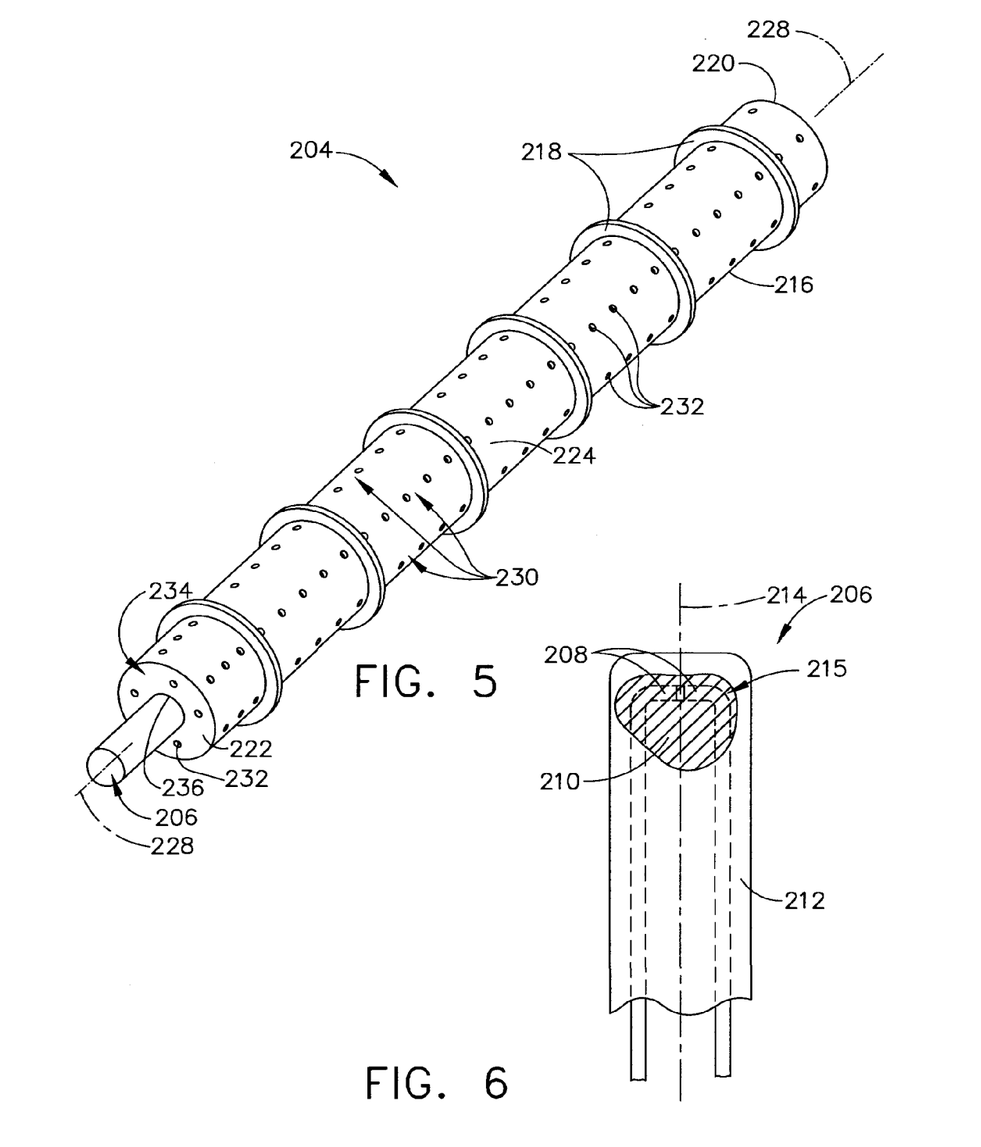
FIG. 5 is a perspective view of a cooling system of the temperature sensing device shown in FIG. 3.
FIG. 6 is a schematic partial cross-sectional illustration of a portion of a sensor unit of the temperature sensing device shown in FIG. 3.
Figure 7:
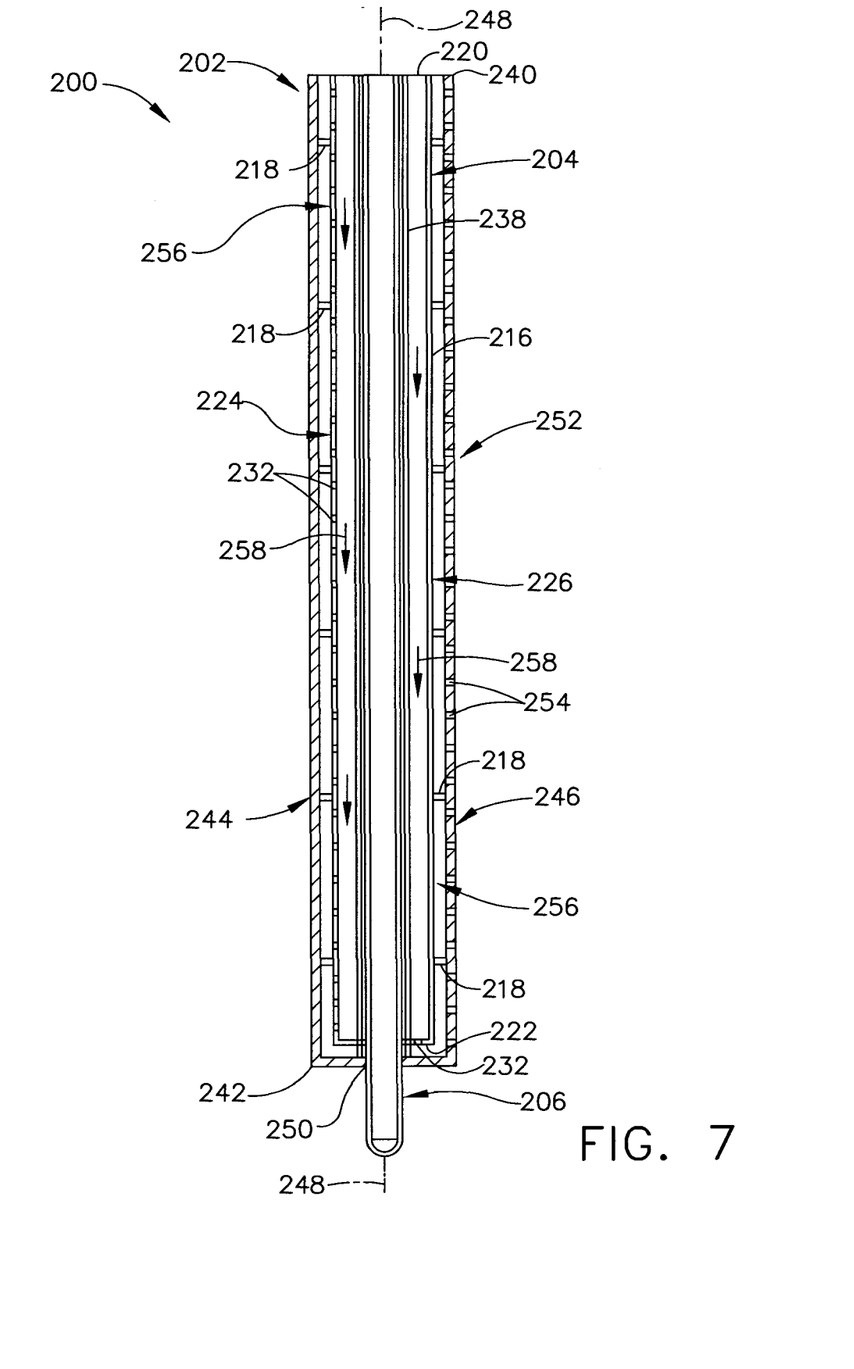
FIG. 7 is a cross-sectional view of the temperature sensing device shown in FIG. 3.

FIGS. 3 and 4 are perspective and exploded views, respectively, of temperature sensing device 200. In the exemplary embodiment, temperature sensing device 200 includes a housing 202, a cooling system 204, and a sensor unit 206. FIG. 5 is a perspective view of cooling system 204 with sensor unit 206 disposed therein, FIG. 6 is a schematic partial cross-sectional illustration of a portion of sensor unit 206, and FIG. 7 is a cross-sectional view of temperature sensing device 200 with the assembled cooling system 204 and sensor unit 206 disposed within housing 202.

In the exemplary embodiment, sensor unit 206 has a longitudinal axis 214 and includes a temperature sensor 208 (e.g., a platinum-based, S-type thermocouple) disposed within an insulation material 210 (e.g., a ceramic powder) and housed within a shell 212, such as a grain-stabilized, platinum-based shell (i.e., sensor unit 206 includes a sealed and isolated temperature sensor 208). Temperature sensor 208 has a tip 215. In some embodiments, shell 212 may include an array of longitudinally extending, circumferentially spaced-apart fins that facilitate locating sensor unit 206 in housing 202, as described in more detail below. In other embodiments, shell 212 may be fabricated from an austenitic nickel-chromium-based alloy material. Alternatively, sensor unit 206 may have any suitable configuration of temperature sensor, insulation, and/or shell fabricated from any suitable material that facilitates enabling temperature sensing device 200 to function as described herein.

In the exemplary embodiment, cooling system 204 includes a cooling channel 216 and a plurality of support ribs 218 extending outward from cooling channel 216. Cooling channel 216 has a proximal end 220, a distal end 222, a forward region 224, an aft region 226, and a longitudinal axis 228 extending from proximal end 220 to distal end 222. Forward region 224 has a plurality of parallel, longitudinally extending rows 230 of spaced-apart impingement apertures 232, and distal end 222 has a generally annular arrangement 234 of impingement apertures 232 spaced apart from one another about a sensor unit through hole 236. In the exemplary embodiment, support ribs 218 are generally ring-shaped and are coupled to (e.g., brazed to) cooling channel 216 in a longitudinally spaced-apart relationship. In some embodiments, support ribs 218 may be integrally formed with cooling channel 216, rather than being formed separately from and coupled to cooling channel 216. In other embodiments, support ribs 218 may have any suitable shape and arrangement on cooling channel 216 that facilitates enabling temperature sensing device 200 to function as described herein.

In the exemplary embodiment, as described in more detail below, cooling channel 216 is surrounded by cooling air within housing 202 during operation of gas turbine engine 100 such that cooling channel 216 is not exposed to combustion gas flow 142 within combustion chamber 128. In one embodiment, cooling channel 216 is configured to have a cooler service temperature of about the anticipated temperature of the cooling air that surrounds cooling channel 216 within housing 202 during operation. In this manner, cooling channel 216 is less susceptible to creep and, therefore, is configured to provide significant structural support for temperature sensing device 200 to withstand the velocity of combustion gas flow 142 through combustion chamber 128 during operation of gas turbine engine 100. In one embodiment, cooling channel 216 is fabricated from an austenitic nickel-chromium-based alloy for high strength, low conductivity, and low oxidation. Alternatively, cooling channel 216 may be fabricated from any suitable material that facilitates enabling temperature sensing device 200 to function as described herein.

In the exemplary embodiment, housing 202 is generally cylindrically shaped and has a proximal end 240, a distal end 242, a forward region 244, an aft region 246, and a longitudinal axis 248 extending from proximal end 240 to distal end 242. In one embodiment, housing 202 is fabricated from a platinum-based material to facilitate better resistance against oxidation and thermal fatigue associated with exposure to combustion gas flow 142 within combustion chamber 128. In another embodiment, housing 202 may be fabricated from a platinum-based material having rhodium. In other embodiments, housing 202 may be fabricated from any suitable material that facilitates enabling temperature sensing device 200 to function as described herein.

In the exemplary embodiment, a sensor unit through hole 250 is defined in distal end 242, and a substantially longitudinal row 252 of spaced-apart exit apertures 254 is defined on aft region 246. In one embodiment, exit apertures 254 may be generally circular in shape and may be substantially equally spaced. In another embodiment, exit apertures 254 may be elongated in shape (e.g. elliptically shaped). In some embodiments, exit apertures 254 may vary in shape and/or spacing along longitudinal axis 248 to facilitate increasing or decreasing cooling air flow out of housing 202 at predetermined locations along longitudinal axis 248 (e.g., exit apertures 254 may be smaller near proximal end 240 of housing 202 and larger near distal end 242 of housing 202). In other embodiments, housing 202 may also include a tip cover (not shown) (e.g., fabricated from a platinum-based material such as, for example, a grain stabilized platinum material), and the tip cover extends from distal end 242 of housing 202 at sensor unit through hole 250. The tip cover may be pressed and/or welded to distal end 242 such that, when sensor unit 206 is disposed within housing 202, tip 215 is disposed within the tip cover of housing 202 (e.g., shell 212 may have fingers or threads to locate tip 215 within the tip cover). Alternatively, housing 202 may have any suitable configuration that facilitates enabling housing 202 to function as described herein (e.g., housing 202 may have a single, elongated exit slot extending substantially from proximal end 240 to distal end 242, rather than having spaced-apart exit apertures 254; or exit apertures 254 may not be defined on aft region 246 but, rather, may be defined on a side region of housing 202).

In the exemplary embodiment, housing 202 includes an internal support sleeve 238 that is integrally formed with distal end 242. Support sleeve 238 is aligned with sensor unit through hole 250 and extends longitudinally from distal end 242 to proximal end 240 such that support sleeve 238 is open at both ends 240, 242 of housing 202. In an assembled configuration, sensor unit 206 is inserted into support sleeve 238 such that sensor unit 206 is substantially centrally located within housing 202 with a portion of sensor unit 206 (e.g., tip 215) disposed outside of housing 202 via sensor unit through hole 250. In an alternative embodiment, rather than having support sleeve 238 for locating sensor unit 206 within housing 202, shell 212 of sensor unit 206 may be provided with the array of longitudinally extending fins described above, and the fins would facilitate locating sensor unit 206 within cooling channel 216 (e.g., substantially centrally within cooling channel 216) while still enabling cooling air to flow longitudinally along cooling channel 216.

In the exemplary embodiment, cooling system 204 and sensor unit 206 are disposed within housing 202 such that cooling channel 216 envelops support sleeve 238 (and, therefore, sensor unit 206) and such that housing 202 envelops cooling channel 216 with support ribs 218 locating cooling channel 216 substantially centrally within housing 202. In this manner, adjacent support ribs 218 define a plurality of separate, annular cooling regions 256 arranged longitudinally along housing 202 to facilitate a more uniform distribution of cooling air throughout housing 202. In the exemplary embodiments, support ribs 218 are not coupled to housing 202, thereby enabling cooling system 204 to be readily removable from housing 202. In other embodiments, support ribs 218 may be suitably coupled (e.g., welded) to housing 202. In the exemplary embodiment, cooling system 204 is oriented within housing 202 such that forward region 224 of cooling channel 216 faces toward forward region 244 of housing 202 (i.e., impingement apertures 232 are oriented to direct cooling air toward forward region 244 of housing 202 because forward region 244 of housing 202 experiences increased thermal stress during operation of gas turbine engine 100 due to forward region 244 facing upstream into combustion gas flow 142 when housing 202 is mounted within gas turbine engine 100 as described in more detail below). Additionally, sensor unit 206 extends outside of housing 202 via through hole 250 such that a portion of sensor unit 206 (e.g., tip 215) is disposed outside of housing 202 in combustion gas flow 142 of combustion chamber 128 during operation of gas turbine engine 100. In one embodiment, a portion of shell 212 of sensor unit 206 being outside of housing 202 facilitates preventing temperature sensor 208 from contacting housing 202, or otherwise being cooled by housing 202, thereby enabling temperature sensor 208 to accurately determine a temperature within combustion chamber 128.

With temperature sensing device 200 assembled as described above, temperature sensing device 200 is mounted on outer casing structure 116 at proximal end 240 of housing 202 such that temperature sensing device 200 extends into combustion chamber 128 through outer bypass flow path 132 with tip 215 being disposed outside of housing 202 within combustion chamber 128 (e.g., temperature sensing device 200 may be coupled to outer casing structure 116 in a spring-loaded manner within a counter-bore of outer casing structure 116). In one embodiment, temperature sensing device 200 is coupled to outer casing structure 116 such that cooling channel 216 is in flow communication with outer bypass flow path 132 (e.g., via an engine interface seal having entrance apertures for venting outer bypass flow 138 from outer bypass flow path 132 into cooling channel 216) and such that exit apertures 254 are in flow communication with combustion chamber 128. In other embodiments, temperature sensing device 200 may be configured to receive cooling air from any suitable flow path of gas turbine engine 100. In the exemplary embodiment, housing 202 is oriented such that forward region 244 faces upstream relative to combustion gas flow 142 (i.e., toward fuel nozzle 120) and such that aft region 246 faces downstream relative to combustion gas flow 142 (i.e., away from fuel nozzle 120). Alternatively, temperature sensing device 200 may be mounted or oriented within gas turbine engine 100 in any suitable manner that facilitates cooling housing 202 via a flow of cooling air as described herein.

Figure 8:
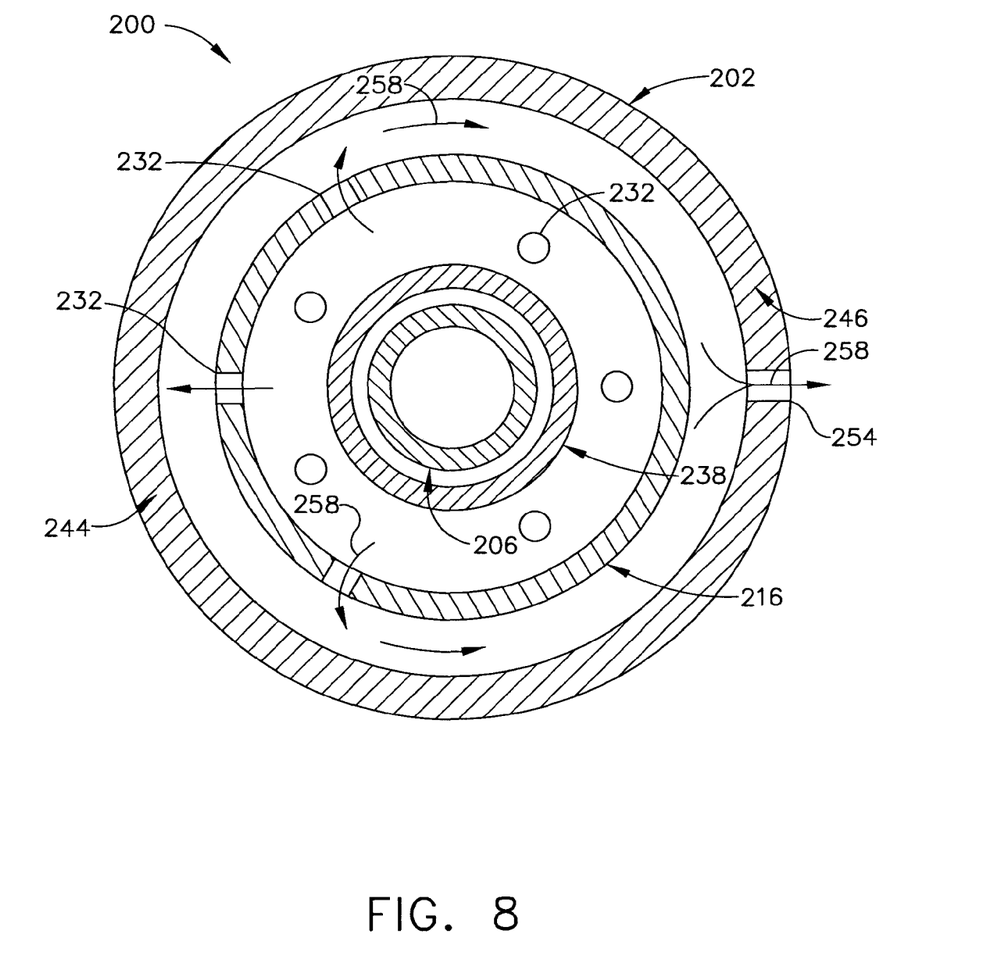
FIG. 8 is a schematic illustration of cooling air flow through the temperature sensing device shown in FIG. 3 during operation of the gas turbine engine shown in FIG. 1.

FIG. 8 is a schematic illustration of cooling air flow through temperature sensing device 200. During operation of gas turbine engine 100, the pressure differential between outer bypass flow path 132 and combustion chamber 128 causes outer bypass flow 138 to be drawn into cooling channel 216 (e.g., via the entrance apertures of the engine interface seal). Because the temperature of combustion gas flow 142 within combustion chamber 128 ranges from about 2,300° F. to about 2,800° F. and because the temperature of outer bypass flow 138 is cooler than that of combustion gas flow 142, outer bypass flow 138 functions as cooling air 258 for temperature sensing device 200. Cooling air 258 is directed longitudinally through cooling channel 216 from proximal end 240 toward distal end 242. As cooling air 258 flows through cooling channel 216, cooling air 258 is discharged from cooling channel 216 through impingement apertures 232 and toward forward region 244 of housing 202. Cooling air 258 discharged from impingement apertures 232 is permitted to flow within regions 256 and is subsequently exhausted from housing 202 through exit apertures 254 and into combustion gas flow 142. In other embodiments, cooling air 258 from within housing 202 may be exhausted back into outer bypass flow path 132 (e.g., through the engine interface seal), into any other suitable flow path of gas turbine engine 100, and/or into the ambient via any suitable arrangement of exhaust channels in flow communication with housing 202.

As cooling air 258 circulates within regions 256, cooling air 258 facilitates cooling housing 202 via convection to reduce the increased housing temperature that is induced by combustion gas flow 142 within combustion chamber 128. With tip 215 of temperature sensor 208 being disposed outside of housing 202 via through hole 250, temperature sensor 208 is able to determine a temperature of combustion gas flow 142 within combustion chamber 128. Additionally, because sensor unit 206 is disposed within support sleeve 238 of housing 202 and because temperature sensor 208 is insulated within shell 212, cooling of temperature sensor 208 by cooling air 258 is substantially prevented (i.e., temperature sensor 208 is sufficiently isolated from cooling air 258 to minimize cooling of temperature sensor 208). In this manner, temperature sensing device 200 is configured to determine a temperature of combustion gas flow 142 within combustion chamber 128, while sufficiently withstanding the velocity and temperature of combustion gas flow 142.

Figure 9:
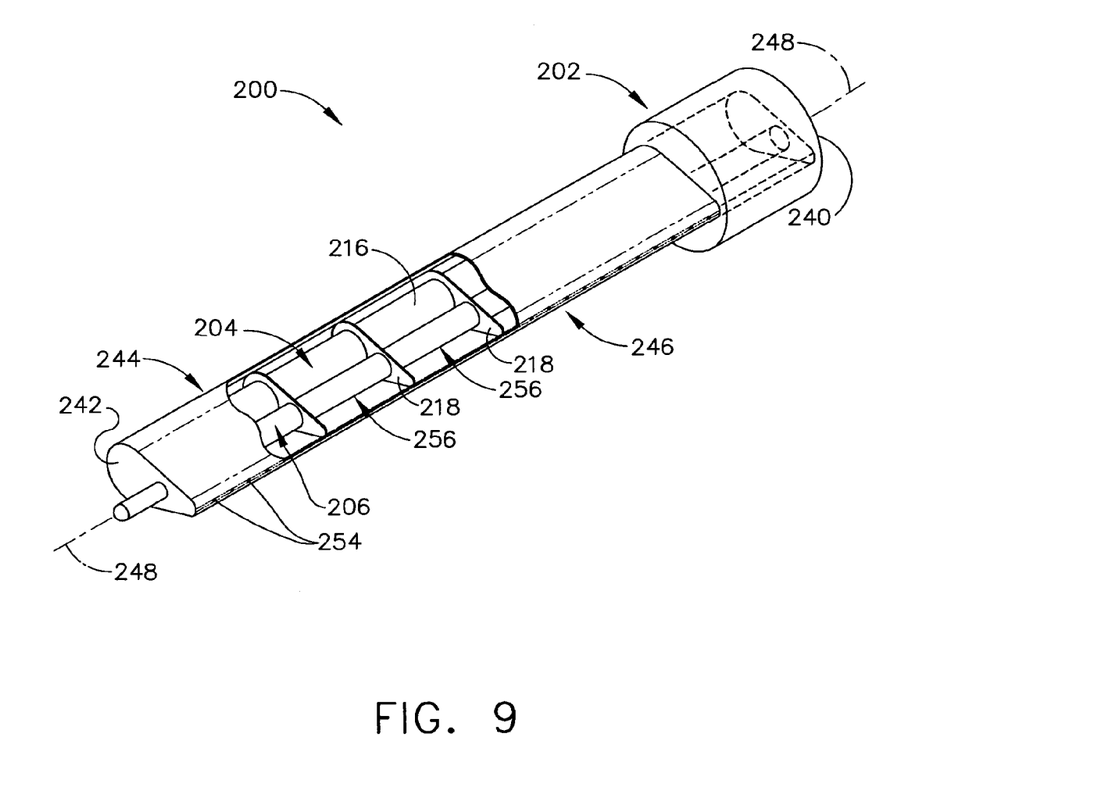
FIG. 9 is a perspective view of another embodiment of the temperature sensing device shown in FIG. 3.
Figure 10:
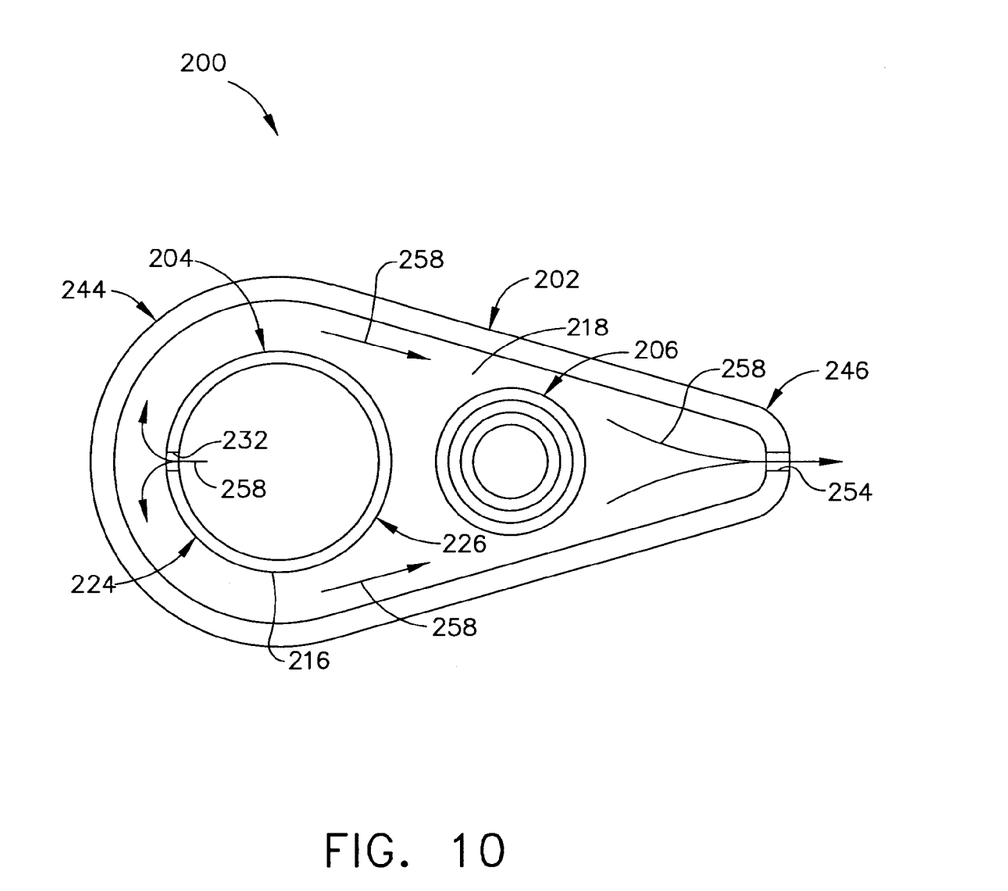
FIG. 10 is a schematic illustration of cooling air flow through the temperature sensing device shown in FIG. 9 during operation of the gas turbine engine shown in FIG. 1.

FIGS. 9 and 10 are a perspective view and a schematic illustration, respectively, of another embodiment of temperature sensing device 200. In the exemplary embodiment, housing 202 has an airfoil shape, and support ribs 218 have corresponding shapes. The airfoil shape of housing 202 facilitates reducing aerodynamic drag associated with obstructing combustion gas flow 142 in combustion chamber 128, in addition to funneling cooling air 258 from forward region 244 of housing 202 toward aft region 246 of housing 202, thereby directing cooling air 258 toward exit apertures 254. Additionally, sensor unit 206 is not disposed within cooling channel 216 but, rather, cooling channel 216 is disposed forward of sensor unit 206 within housing 202 (i.e., support ribs 218 are coupled to cooling channel 216 and to sensor unit 206 such that cooling channel 216 and sensor unit 206 extend through housing 202 in a substantially longitudinal, parallel manner). As such, cooling air 258 is directed longitudinally through cooling channel 216 and is discharged from through impingement apertures 232 such that cooling air 258 flows within regions 256 between adjacent support ribs 218. Cooling air 258 is then exhausted from housing 202 via exit apertures 254 at aft region 246 of housing 202 (i.e., at the trailing edge of the airfoil shape). Because temperature sensor 208 is insulated within shell 212, conductive heat transfer between cooling air 258 and temperature sensor 208 is substantially prevented.

The methods and systems described herein facilitate providing a temperature sensing device configured for inserting a temperature sensor into a combustion gas flow within a combustion chamber to gauge a temperature of the combustion gas flow. The methods and systems described herein also facilitate providing a temperature sensing device having a service limit in excess of 2300° F. The methods and systems described herein further facilitate providing a temperature sensing device that enables a temperature of a combustion gas flow within a combustion chamber to be determined without having to extrapolate downstream temperature data to arrive at an estimated temperature of the combustion chamber. The methods and systems described herein further facilitate providing a temperature sensing device that enables better optimization of engine fuel inputs, thereby increasing engine operating efficiency. The methods and systems described herein further facilitate providing a temperature sensing device that enables better estimations as to the useful life of engine components that are downstream of the combustion section (e.g., turbine blades). The methods and systems described herein therefore facilitate providing a temperature sensing device that increases the operating efficiency and useful life of a gas turbine engine, thereby reducing costs associated with operating the gas turbine engine.

Exemplary embodiments of a temperature sensing device and a method of assembling the same are described above in detail. The methods and systems are not limited to the specific embodiments described herein, but rather, components of the methods and systems may be utilized independently and separately from other components described herein. For example, the methods and systems described herein may have other industrial and/or consumer applications and are not limited to practice with only gas turbine engines as described herein. Rather, the present invention can be implemented and utilized in connection with many other industries.

While the invention has been described in terms of various specific embodiments, those skilled in the art will recognize that the invention can be practiced with modification within the spirit and scope of the claims.

What is claimed is:

1. A method of assembling a temperature sensing device for a gas turbine engine, said method comprising:
   providing a temperature sensor;
   providing a housing that directs cooling air from a forward region of the housing to an aft region of the housing;
   mounting the temperature sensor within the housing such that a tip of the temperature sensor is disposed outside of the housing;
   providing a cooling tube disposed forward of, and substantially parallel to, the temperature sensor within the housing and having a set of impingement apertures, wherein the cooling air is drawn into the cooling tube based at least in part on a pressure differential; and
   providing a set of support ribs that are coupled to the cooling tube and the temperature sensor in a spaced-apart relationship defining a plurality of separate cooling regions, wherein the cooling air is directed, based at least in part on the pressure differential, longitudinally through the cooling tube and discharged through the set of impingement apertures to flow within the cooling regions.

2. The method in accordance with claim 1, further comprising thermally insulating the temperature sensor from the cooling air within the housing.

3. The method in accordance with claim 1, wherein the housing has an airfoil shape and the support ribs have a shape corresponding to the airfoil shape of housing.

4. The method in accordance with claim 1, wherein the cooling air is exhausted through a set of exit apertures in the housing.

5. A temperature sensing device for a gas turbine engine, said temperature sensing device comprising:
   a temperature sensor;
   a housing that envelops a first portion of said temperature sensor such that a second portion of said temperature sensor is disposed outside of said housing, wherein said housing is configured to receive cooling air;
   a cooling channel, having a set of impingement apertures, forward of and substantially parallel to the temperature sensor within the housing, wherein the cooling channel receives the cooling air based at least in part on a pressure differential; and a set of support ribs coupled to the cooling channel and the temperature sensor in a spaced-apart relationship that defines a plurality of separate cooling regions within the housing, wherein the cooling air is directed, based at least in part on the pressure differential, longitudinally through the cooling channel and discharged through the set of impingement apertures to flow within the cooling regions.

6. A device in accordance with claim 5, wherein said temperature sensor is configured to be thermally insulated from the cooling air within said housing.

7. A device in accordance with claim 5, wherein said device is configured to have a service temperature of between 2,300° F. and 2,800° F.

8. A device in accordance with claim 5, wherein said housing comprises a plurality of exit apertures for exhausting the cooling air from said housing.

9. The device in accordance with claim 5, wherein the housing has an airfoil shape that mitigates aerodynamic drag.

10. The device in accordance with claim 5, wherein the housing includes a set of exit apertures through which the cooling air is exhausted.

11. A gas turbine engine comprising:

a combustion section with a combustion chamber; and the temperature sensing device according to claim 5 extending into said combustion chamber.

12. A gas turbine engine in accordance with claim 11, wherein said temperature sensor is configured to be thermally insulated from the cooling air within said housing.

13. A gas turbine engine in accordance with claim 11, wherein said device is configured to have a service temperature of between 2,300° F. and 2,800° F.

14. A gas turbine engine in accordance with claim 11, wherein said housing comprises a plurality of exit apertures for exhausting the cooling air from said housing into said combustion chamber.

15. A gas turbine engine in accordance with claim 11, wherein said combustion section comprises a bypass flow path, said temperature sensing device configured to receive the cooling air from said bypass flow path.

\* \* \* \* \*